Sept. 6, 1955 W. H. SMITH 2,716,796
PRESSES FOR MOULDING PLASTIC SUBSTANCES
Filed Dec. 18, 1951 3 Sheets-Sheet 1
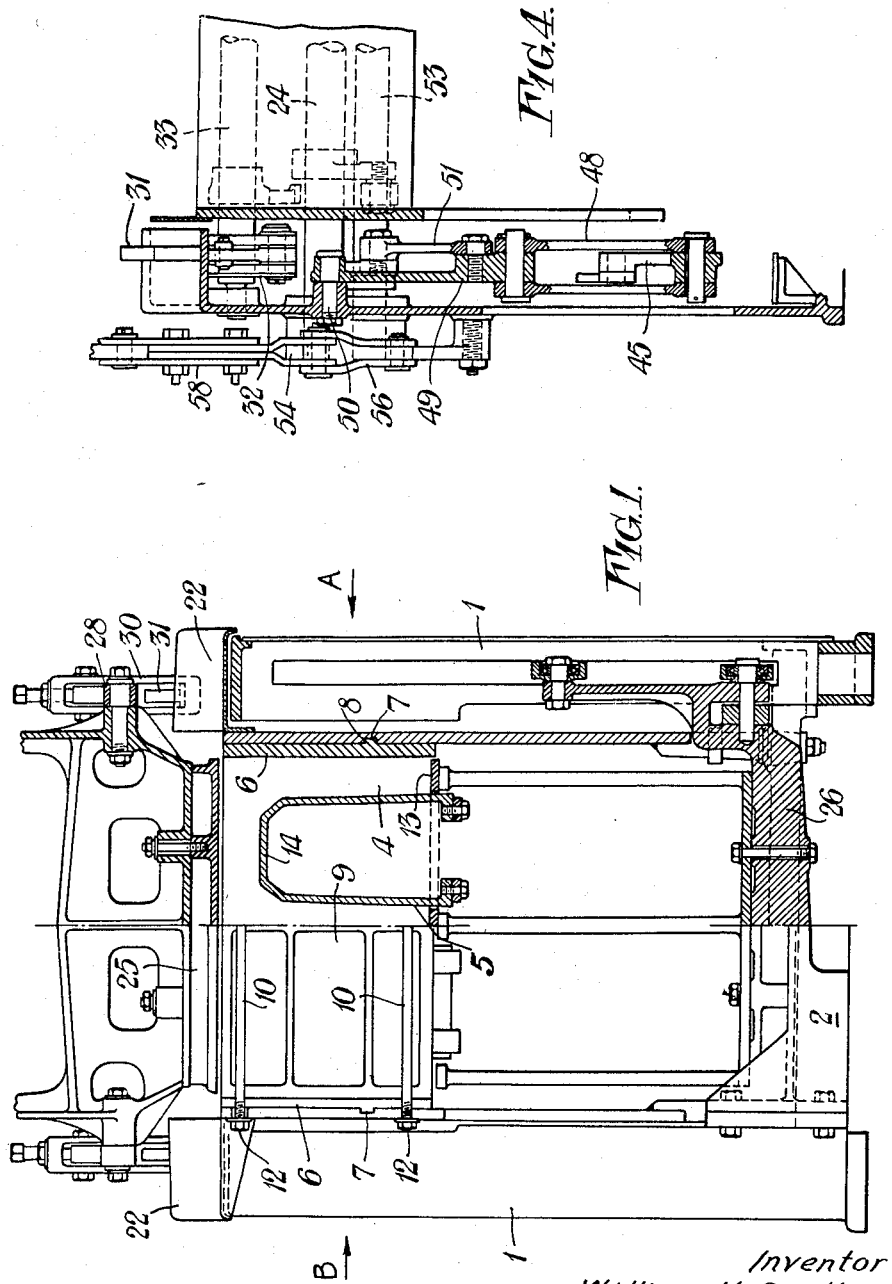
Inventor
William H. Smith,
By
Attorney Sept. 6, 1955 W. H. SMITH 2,716,796
PRESSES FOR MOULDING PLASTIC SUBSTANCES
Filed Dec. 18, 1951 3 Sheets-Sheet 2
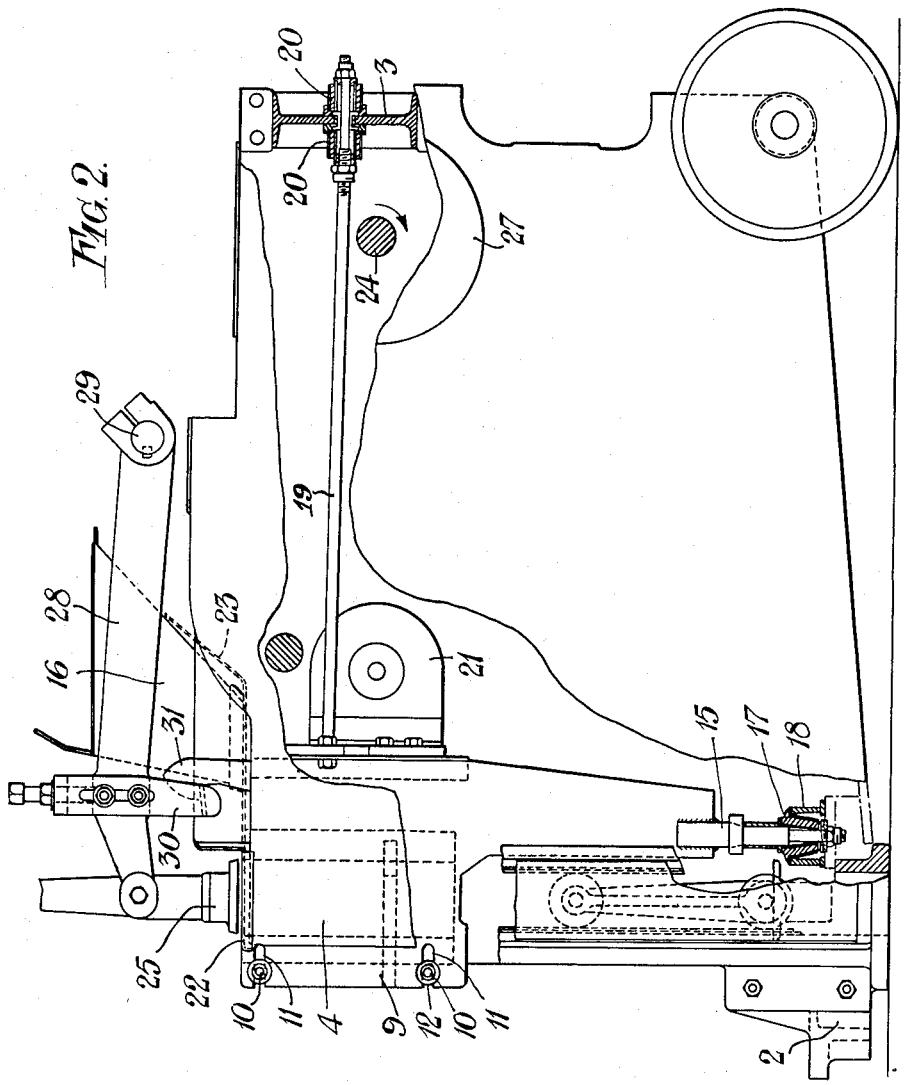
INVENTOR
WILLIAM H. SMITH
BY
ATTORNEY

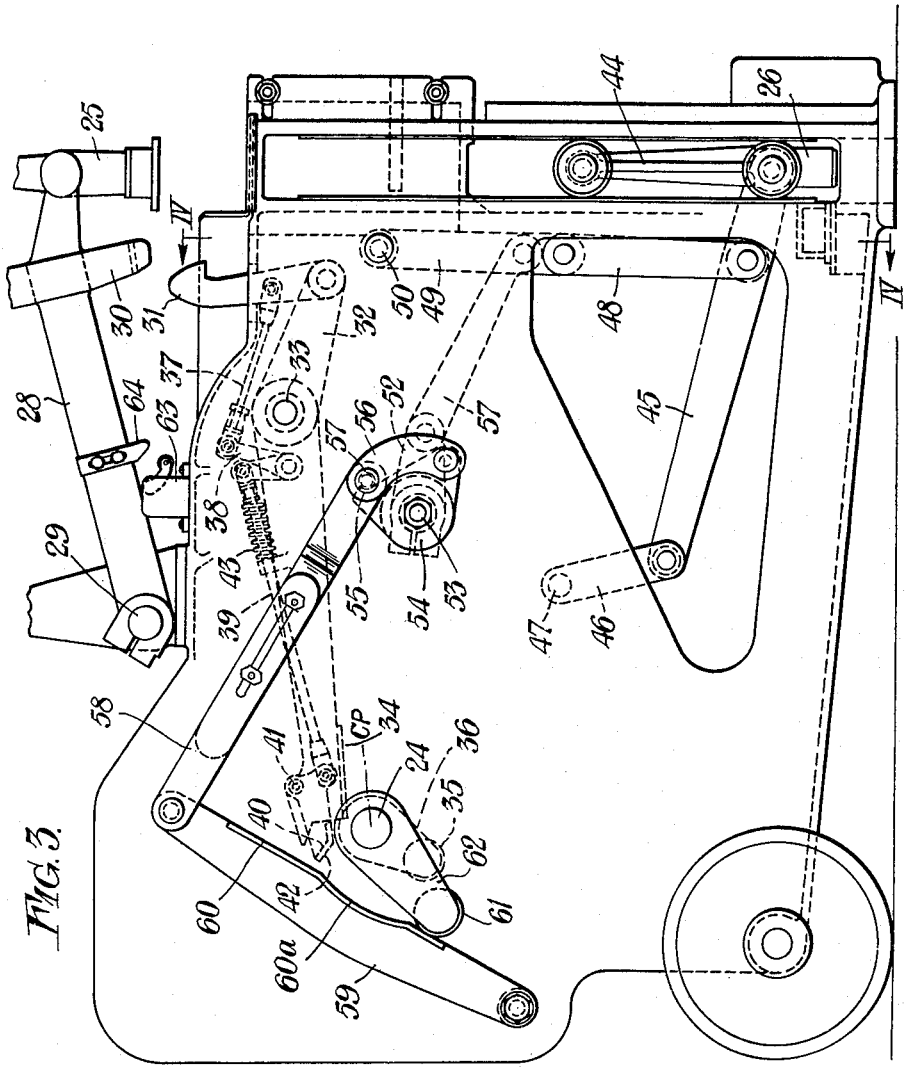

United States Patent Office 2,716,796
Patented Sept. 6, 1955

2,716,796

PRESSES FOR MOULDING PLASTIC SUBSTANCES

William Herbert Smith, East Molesey, England

Application December 18, 1951, Serial No. 262,257

Claims priority, application Great Britain December 21, 1950

6 Claims. (Cl. 25—83)

This invention relates to presses for moulding plastic substances and is particularly applicable to presses for forming blocks or slabs of concrete and like substances, of the kind in which the material is compacted in a mould the bottom or outer member of which is subsequently moved to strip or eject the moulded article from the mould.

Although the invention is applicable to machines in which the moulds are arranged in any direction, to save repetition reference will be made only to the machine in which the mould is vertical and the ejection or stripping member therefor forms the bottom of the mould.

The machine of the present invention may in some respects be regarded as an improvement upon that described in British specification No. 417,486.

The principal features of the machine of the present invention are that high frequency vibration applied to the mould box is isolated from the machine frame and that a modified form of mechanism is used for applying pressure to the material in the mould box.

From one aspect, the invention provides a press for moulding plastic substances in which the mould box is carried in a vibrating cradle resiliently supported from the frame of the machine and vibrated by a vibrator in such a manner that its vibrations are not transferred to the frame of the machine.

From another aspect, in a press for moulding plastic substances the mould box assembly is supported in accordance with the invention on supports resiliently mounted on the machine frame and is maintained vertical by a rod connected resiliently to the frame, and a vibratory unit is mounted on the mould box assembly to vibrate the mould box without vibrating the machine.

From yet another aspect, the invention provides a press for moulding plastic substances in which the material fed into the mould box is compressed by a ram drawn down into the box by hook members adapted to engage the ram and pulled down by a lever actuated by a rotary cam engaging a cam plate on the lever.

From still another aspect, the invention provides a press for moulding plastic substances having means for extruding the completed block from the mould box comprising a ram raised by means including a lever having a cam plate engaged by a rotary cam, said lever operating toggle mechanism connected to a lever raising the extrusion ram.

Other parts of the invention are embodied in the preferred form which will now be described with reference to the accompanying drawings in which certain parts of the machine known in themselves have been omitted for clarity and in which:

Fig. 1 is a part front view and part section of the machine,

Fig. 2 is a side view of the machine in the direction of the arrow A with parts cut away to show clearly the vibratory mechanism.

Fig. 3 is a side view in the direction of the arrow B with parts cut away to show the compression and extrusion mechanism.

Fig. 4 is a half section on the line IV—IV of Fig. 3.

In this form, the machine comprises a frame consisting of two side members 1 rigidly connected by transverse members 2, 3 at front and rear respectively.

Situated between the front ends of the side members 1 is a cradle 4 in which can be mounted a mould box 5 comprising removable side plates 6, keyed by projections 7 in grooves 8 in the cradle, and a front plate 9 retained by cross bars 10 engaged in slots 11 in the cradle and secured by nuts 12. The back of the mould box is formed by the cradle and the bottom by a removable pallet 13. Insets 14 may be provided in the mould if hollow blocks are to be produced. By changing the side plates 6 and varying the position of the bars 10, the size of the mould can be altered in accordance with the size of block to be made.

The cradle 4 is supported on substantially vertical posts 15 which are resiliently connected by rubber bushes 17 to support members 18 fixed to the frame of the machine. Other forms of resilient connection such as metal springs may be used but rubber bushes are preferred as these have a high rate in the downward direction which compensates for extra weight on the cradle and also provide horizontal damping.

The rubber bushes are preferably shaped as shown tapering inwardly towards the bottom so that their rate increases with load.

Horizontal rods 19 attached towards the top of the cradle are resiliently connected by rubber bushes 20 to the transverse frame member 3, a rubber bush being provided at each side of the member 3. The rod 19 is adjustable relatively to the transverse member 3 so that mould boxes of various thicknesses may be centralised relatively to the compression and extrusion mechanism hereinafter described. The bushes 20 may be adjustable to adapt their rate to varying sizes of mould box. This may be done by means of a left and right hand threaded member so that the adjustment is independent of the adjustment of the position of the mould box.

A high frequency vibrating unit 21 (which is conventional in construction) is mounted on the rear of the cradle as high as possible.

This vibrating unit is actuated by switches suitably placed on the machine for either manual operation or through a member of the block making mechanism.

When this unit is operated, it causes the cradle 4 (and so the mould box and concrete or the like contained therein) to vibrate; but because of the resilient mounting of the cradle by the rubber bushes 17 and 20, such vibration is not transmitted to the frame of the machine. The vibration of the mould box is of greater amplitude in the horizontal direction than in the vertical direction and this is advantageous in causing the concrete to settle down in the mould evenly.

The mould box is filled with concrete by a charging box 16 filled from a hopper by a belt conveyor. These latter are conventional in block making machines and are therefore not shown on the drawings. The top of the vibrating cradle is provided with a surround 22 extending across the side frame members 1 and preventing concrete getting between the cradle and the machine frame. It also has an extension 23 sloping upwards and rearwardly at the back to assist feeding of the concrete forwardly into the mould box and prevent it falling over at the rear.

Mounted in one side frame is a known type of gear box indicated at 27 through which a driving shaft 24 is driven from an electric or other motor (not shown). This shaft 24 drives through link mechanism a top ram 25 for compressing the concrete in the mould box and a bottom ram 26 for extruding the moulded block.

The top ram 25 is suspended from arms 28 (one at each side of the machine), which are pivotally mounted on axles 29 supported from the side frames. As shown in Fig. 2, these arms comprise parallel link mechanism so that the ram moves vertically. These arms are spring loaded so as to bias the ram to its uppermost position. Each arm 28 has a projection 30 having a hole therethrough in which can be engaged a hook 31. The hook 31 is pivoted at one end of a lever 32 pivotable about a shaft 33 mounted transversely of the machine frame. The other end of the lever 32 carries on its underside a cam plate 34 with which contacts a roller 35 on a crank 36 mounted on the drive shaft 24.

The hook 31 is connected by link 37, bell-crank 38, and link 39 to a pawl 40 pivoted to the lever 32 at 41 and having a cam face 42 which is also contacted during the rotation of crank 36 by the roller 35.

The machine is stopped automatically when the crank 36 is in the position indicated by the line C. P. The top ram 25 is pulled down manually to engage the hook 31, the machine being started to rotate the shaft 24 (in the anticlockwise direction as seen in Fig. 3). The roller 35 contacts the cam plate 34 and raises it thereby drawing the hook 31 downwardly and with it the ram 25 into the mould box. The pressure exerted by the ram is determined by height of the cam plate and this may be adjustable to increase or decrease the pressure.

As the roller 35 passes the end of lever 32, this lever drops downwardly relieving the pressure of hook 31 on the projection 30. Further rotation of the crank 36 brings the roller 35 into contact with the pawl 40 turning this about its pivot 41 and pulling back the hook 31, thereby releasing the top ram which rises under spring loading. The hook 31 is returned by the spring 43.

The bottom ram 26 supports the pallet through extension rods 44 and is raised and lowered relatively to the mould box by mechanism operated by the drive shaft 24. The ram 26 is pivotally connected to a lever 45 which in turn is pivotally connected to a link 46 pivoted at 47 to the frame of the machine. The lever 45 is pivotally connected to one end of a toggle mechanism 48, 49 the other end of which is pivotally connected to the frame at 50. This toggle mechanism is connected by a driving link 51 to an arm 52 fixed on a shaft 53 on which is also fixed a plate 54 having a step 55 in its edge. A link 56 is pivoted to the plate at one end and at its other end 57 abuts against the step 55. This end 57 is connected by a connecting rod 58 to a cam plate lever 59 which is pivoted at one end to the frame of the machine and between its ends carries a cam surface 60. A roller 61 is carried on an arm 62 fixed to the driving shaft 24 and contacts the cam surface 60 as the driving shaft rotates (anti-clockwise in Fig. 3).

The cam plate lever is pushed backwards by the roller 61 as the arm 62 rotates and through the rod 58 and link 56 rotates the plate 54. At first the rod 58 pulls against the step 55 but as the link 56 comes into alignment with the rod 58, the force is transmitted through the link 56. This permits of a large angular movement of plate 55 being obtained.

Movement of the plate 55 causes through arm 52 and driving link 51 movement of toggle 48, 49 which in turn raises the lever 45 and hence the ram 26.

The cam surface 60 is formed with an arcuate portion 60a so that the roller 61 during this part of its movement maintains the lever 59 stationary for an idling period during which the ram 26 is at the top of its stroke and the block made in the mould box can be removed. After the roller 61 leaves the arcuate portion 60a, the ram 26 is allowed to drop to the bottom of its stroke under gravity.

The timing of the movements of the ram 26 may be adjusted by varying the length of the connecting rod 58.

The operation of the machine should now be clear.

With the bottom ram 26 at the bottom of its stroke a pallet is dropped into the mould box. The motor of the machine is started by hand and the feed conveyor is started by means of a control pedal. The mixture box 16 is drawn forward over the mould box thus filling it with mixture. The vibrating unit is started either by hand before feeding of mixture commences or preferably by a starting switch operated by the control pedal of the feeding conveyor. As the mould is being filled it is continually vibrated thus compacting the mixture.

Because of the mounting of the mould box, the amplitude at the bottom of the mould where the mixture is vibrated for the longest time is less than at the top and preferably the design is such that the product of amplitude of vibration and time of vibration of the mixtures at top and bottom of the box is approximately the same. This ensures that the mixture is uniformly compacted throughout the depth of the box.

More specifically, when the mould box is vibrated, it oscillates about its connection with the bottom of the frame, that is about a horizontal axis through the bushes 17 and transversely of the machine. The top of the mould, therefore, moves through a greater distance than the bottom of the mould, that is the amplitude of vibration is greater at the top than at the bottom. If, as is the practice, the mould is vibrated as the mixture is fed into it, the mixture at the bottom of the mould will be vibrated for a longer time than that at the top, the extra time being that needed to fill the mould. According to the present invention, the design of the machine is such that the product of amplitude and the time of vibration is the same at the top of the mould as it is at the bottom. This is easily done (once the need for it has been appreciated) by selecting suitable rubber bushes, and a suitable height for the mould box above the bushes.

The machine stops automatically when the crank 36 reaches the position indicated at C. P. and is restarted by pulling down the top ram 25 either at once or with some delay if longer vibration is desired. Pulling down the ram 25 stops the vibrating unit by means of the switch 63 operated by the trip plate 64 carried by the arm 28 which is adjustable to suit the required conditions as to vibration.

The arm 28 is engaged by the hook 31 which pulls down the ram to compress the block in the manner described. The mechanism driving the hook 31 is arranged first to draw the ram down quickly and then gradually more slowly as the mixture becomes compressed and the pressure increases. Towards the end of the stroke of ram 25, the pressure of hooks 31 is released and thereafter the hooks 31 are withdrawn by the trip mechanism allowing the ram 25 to rise under spring pressure.

Further rotation of the drive shaft 24 brings roller 61 against the cam surface 60 and lifts the bottom ram 26. The toggle mechanism ensures that a relatively high pressure is applied slowly to the ram 26 at the bottom of its stroke when of course the block is fixed firmly in the mould box and less pressure at a higher speed is used when the block has been freed from the box. The ram 26 is maintained at the top of its stroke with the block outside the mould box for a short interval during which the block can be lifted away. The ram 26 then drops to its lowermost position and the machine is ready for another operation.

It will be appreciated that the cam surface 60 can be chosen so as to give any desired movement to the ram 26.

It will be understood that the invention is not restricted to the details of the preferred form which can be modified with departing from the broad ideas underlying them.

I claim:

1. A press for moulding blocks of cementitious material comprising a frame, a cradle adapted to support a mould box, a vibrator mounted on the cradle, resilient means beneath said cradle supporting its weight from said frame and absorbing vertical vibrations of said cradle before transmission to said frame, substantially horizontal rods extending from said cradle, and extending through said frame, resilient means connected with and surrounding said horizontal rods, whereby longitudinal movement of said rods is transmitted to said resilient means and horizontal vibration of said cradle is absorbed before transmission to said frame, means for compressing into a block cementitious material fed into the mould box and means for ejecting said block from said mould box.

2. A press for moulding blocks of cementitious material comprising a frame, a cradle adapted to support a mould box, a vibrator mounted on the cradle, rubber bushes beneath said cradle supporting its weight from said frame and absorbing vertical vibrations of said cradle before transmission to said frame, substantially horizontal rods extending from said cradle, and extending through said frame, rubber bushes connected with and surrounding said horizontal rods and housed in said frame whereby longitudinal movement of said rods is transmitted to said surrounding rubber bushes and horizontal vibration of said cradle is absorbed before transmission to said frame, means for compressing into a block cementitious material fed into the mould box, and means for ejecting said block from said mould box.

3. A press according to claim 2 in which the rubber bushes connecting the supporting members bearing the weight of the mould box assembly are tapered inwardly and downwardly.

4. A press according to claim 2 in which the said horizontal rods connecting the mould box assembly to the frame pass through the machine frame and rubber bushes are provided on each side of the machine frame.

5. A press according to claim 1 in which said mould box is movable in a horizontal direction and said horizontal rods are adjustable to centralize the mould box.

6. A press according to claim 2 in which the compression of the rubber bushes on the horizontal rods are adjustable to vary their damping rate.

References Cited in the file of this patent

UNITED STATES PATENTS

| | | |
|---|---|---|
| 1,800,401 | Pelton | Apr. 13, 1931 |
| 1,868,072 | Parker | July 19, 1932 |
| 2,299,724 | Appley | Oct. 27, 1942 |
| 2,400,631 | Darden | May 21, 1946 |
| 2,407,168 | Lindkvist | Sept. 3, 1946 |
| 2,480,477 | Jones | Aug. 30, 1949 |
| 2,589,594 | Asbell | Mar. 18, 1952 |

FOREIGN PATENTS

| | | |
|---|---|---|
| 417,846 | Great Britain | Oct. 8, 1934 |